Figure 4:
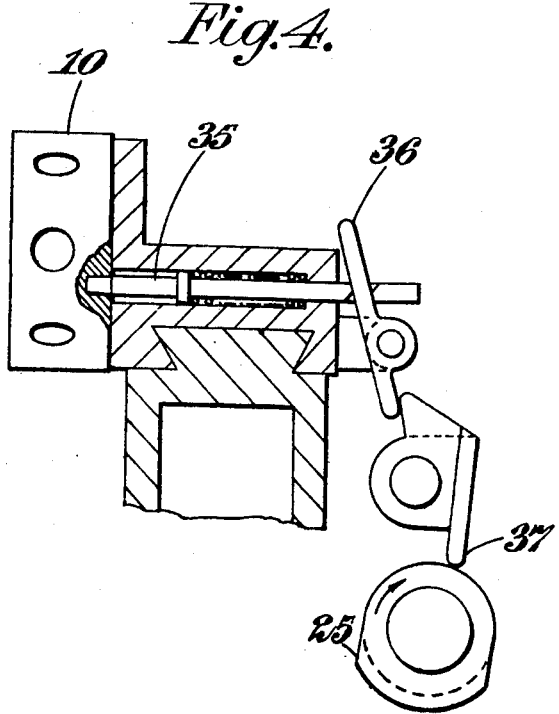

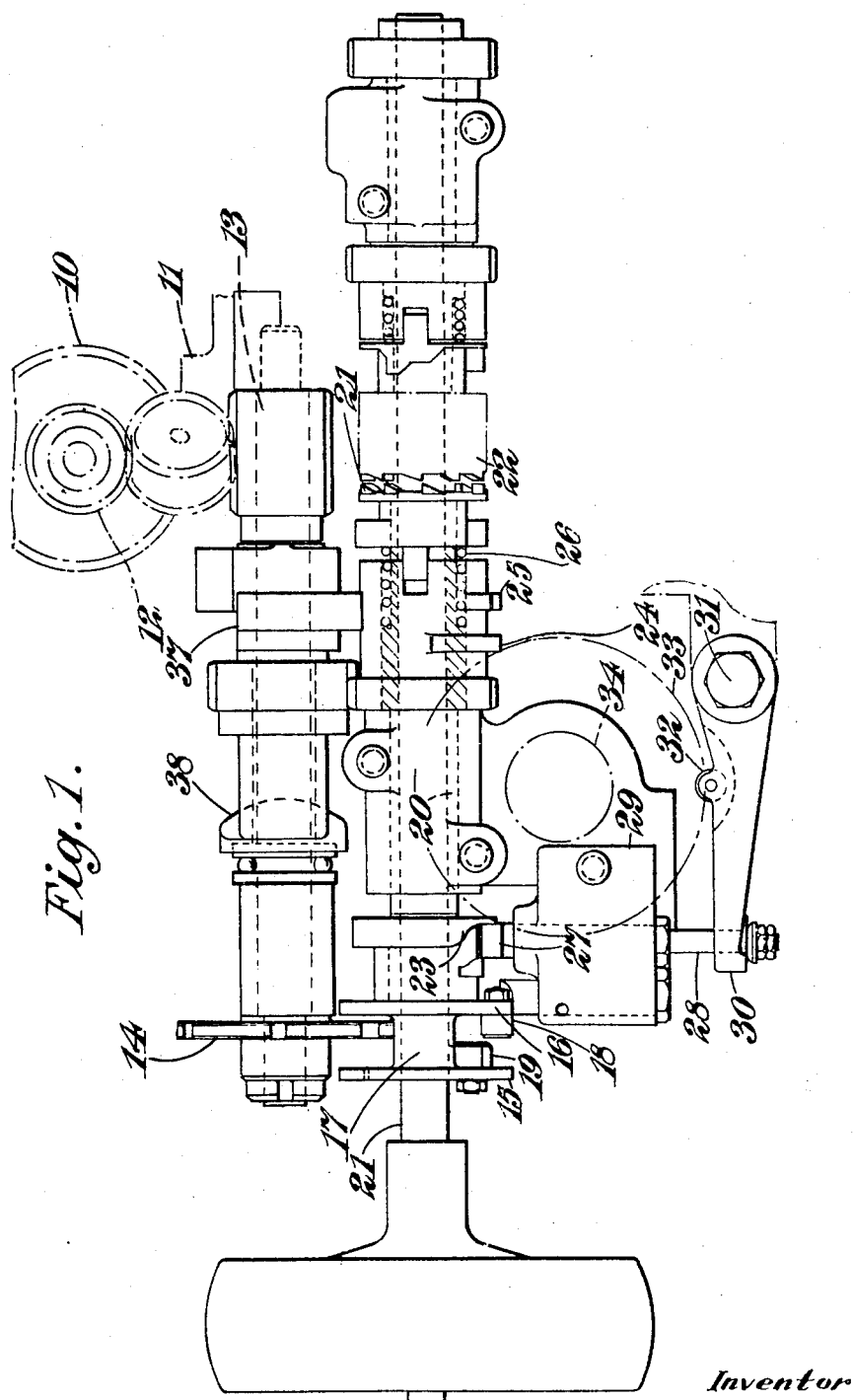

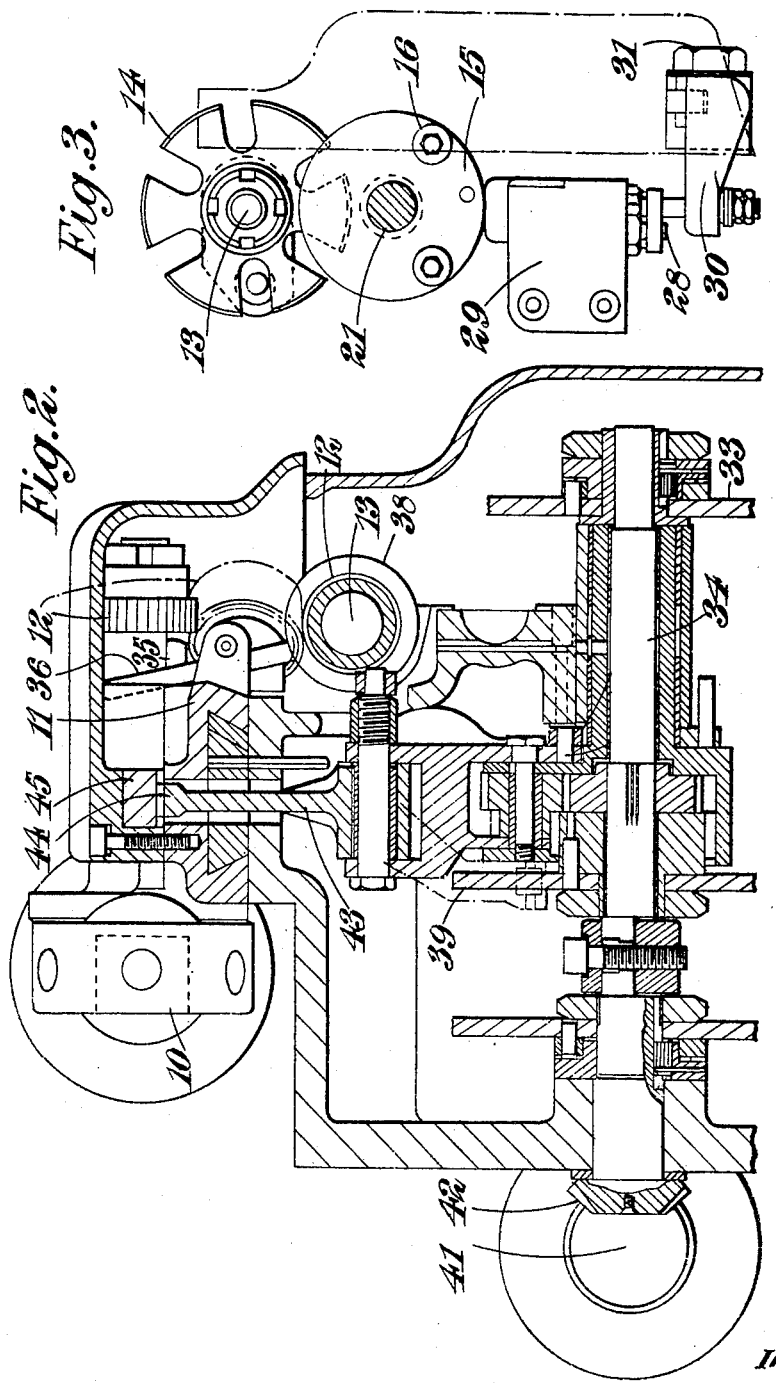

July 17, 1956

W. E. R. PULMAN 2,754,699

INDEXING MECHANISM FOR THE TURRETS
OF AUTOMATIC MACHINE TOOLS

Filed May 5, 1952

3 Sheets-Sheet 3

Inventor
William Elias Reginald Pulman

United States Patent Office 2,754,699
Patented July 17, 1956

2,754,699

INDEXING MECHANISM FOR THE TURRETS OF AUTOMATIC MACHINE TOOLS

William Elias Reginald Pulman, Hove, England, assignor to C. V. A. Jigs, Moulds & Tools Limited, Hove, England, a British company Application May 5, 1952, Serial No. 286,054

14 Claims. (Cl. 74—813)

This invention relates to indexing mechanism for the turrets of automatic machine tools of the kind in which during a complete cycle of the machine the turret is moved at predetermined intervals step by step into a plurality of positions throughout one revolution thereof. For example, provision may be made for six different positions of the turret. it will be appreciated however that in those cases where only a comparatively few machining operations are required to be carried out during one cycle of the machine a considerable time may be wasted if the turret is indexed step by step through all its positions and an object of the present invention is to overcome that drawback.

According to this invention, an indexing mechanism of the kind referred to for the turret of a machine tool is characterised in that a step-by-step transmission is provided with means for varying the angular extent of the steps whereby the turret may be rotated either at an angular distance corresponding to two adjacent positions on the turret or by an extent corresponding to a predetermined number of positions. In the case where the step by step indexing transmission comprises a Geneva mechanism, the means for varying the angular extent of the steps comprises means for bringing into operation either a single dog or a number of angularly displaced dogs on a driving member whereby during a single revolution of the driving member either a single slot is engaged by a dog or a number of slots on the Geneva wheel are successively engaged by a number of dogs on the driving member. In one arrangement according to the invention, two dog carriers are arranged on a driving shaft, one on either side of a Geneva wheel, one of which carries a single dog and the other carries two angularly displaced dogs capable of engaging successive slots in the Geneva wheel and means are provided for effective relative axial movement between the dog carriers and the Geneva wheel whereby the engagement of the slots may be effected either by one dog or by the two dogs.

Automatically operated locking means are provided for locking the turret in an index position and means are provided for timing the automatic operation of the locking means in accordance with the extent of angular rotation imparted to the turret.

The timing means may comprise two cams disposed apart along a shaft which cams may be selectively brought into engagement with a single cam follower, which actuates the locking means, which selective engagement is effected by the relative movement between the dog carriers and the Geneva wheel.

The following is a description of the invention as applied to an automatic turret lathe such as is described in the specification of patent application Serial No. 288,588 filed May 19, 1952, patent application Serial No. 286,053 filed May 5, 1952, and Patent No. 2,654,271 reference being made to the accompanying drawing in which:

Figure 1 is a front elevation of a part of the lathe embodying a back shaft and intermediate shaft, Figure 2 is an end elevation of a part of the lathe showing the front shaft and cross shaft, Figure 3 is an end view of the back shaft and intermediate shaft looking from the left of Figure 1, and Figure 4 is an end elevation and part section through the turret locking mechanism arc.

A six position turret 10 is rotatably mounted on the turret slide 11 and may be driven through gearing 12 from an intermediate shaft 13 in the manner described in the specification of application No. 286,053. The intermediate shaft 13 has fixed to it a Geneva wheel 14 having six slots. The periphery of the Geneva wheel extends between two parts 15, 16 of an axially movable dog carrier 17. The part 16 has a single dog in the form of a roller 18 mounted upon it, while the other part 15 has two rollers 19 arranged one on either side of the roller 18 and angularly spaced from one another by 120°. If the dog carrier 17 is moved into a position in which the single dog 18 may engage the Geneva wheel then a single revolution of the dog carrier will rotate the Geneva wheel 60°, while should the dog carrier be moved into a position in which the two dogs 19 engage the Geneva wheel then one revolution of the dog carrier will result in the two dogs engaging successively two of the slots in the Geneva wheel, thus rotating it through 120°.

The dog carrier 17 is fixed to a sleeve 20 which is axially adjustable along a back shaft 21 which it encircles and to which it may be clutched by a one revolution stop clutch 21, 22 which may be controlled in the manner described in the specification of Patent No. 2,654,271. Also fixed to the sleeve 20 is a disc cam 23 having a cam track formed on a side face thereof, and two cams 24 and 25 having differently shaped cam tracks on their peripheries. The sleeve 20 and its cams is normally urged to the left, as shown in Figure 1 by a spring 26 so that the dog carrier 16 with the single roller 18 is in line with the Geneva wheel 14. A cam follower 27 may be moved radially into engagement with the cam track on the side of the disc cam 23, and since the cam follower is restrained against lateral movement with the cam track, it will have the effect of moving the sleeve 20 and its cams to the right bringing the two rollers 19 on the dog part 15 into engagement with the Geneva wheel 14. The cam follower 27 is mounted on a rod 28 slidable in a block 29, and having its lower end engaged by the forked or drilled extremities of a lever arm 30 pivoted at 31. The lever arm 30 is provided with a roller 32 intermediate of its ends which engage the periphery of a cam 33 adjustably mounted on the cross shaft 34.

As is usual the turret after having been indexed is locked in position by a spring pressed pin 35 which may be withdrawn before indexing takes place by a pivoted withdrawing lever 36 which is actuated by a cam follower 37. The cam follower engages one or other of the cams 24, 25. Hence the angular movement of the turret varies according to whether indexing is effected by the single dog 18 or by two dogs 19. The timing of the withdrawal of the locking pin 35 is also required to be varied, and this is automatically effected by bringing one or other of the differently shaped cams 24, 25 into engagement with the cam follower 37 when the dog carrier 17 is moved axially. In operation, the position of the cam follower 27 determines which of the two parts 15, 16 of the dog carrier 17 co-operate with the Geneva wheel 14 and therefore determines the angular movement of the turret. The cam 33 is so shaped as to give the required position to the cam follower 27 at different times in the cycle of operations.

Withdrawal movement of the turret slide 11 is effected by a cam 38 on the intermediate shaft 13 in the manner described in the specification of Patent No. 2,654,271.

The feed movement of the turret slide is effected by a cam 39 on the cross shaft 34, which shaft is driven from the front shaft 41 through suitable gearing 42. The cam 39 engages a follower on a lever arm 43 the extremity of which is provided with a toothed segment 44 engaging a rack 45 on the turret slide.

I claim:

1. An indexing mechanism for turret lathes and the like having a rotatable turret connected to a drive shaft by intermediate gears, comprising a Geneva wheel connected to said drive shaft, a back shaft driven by a lathe drive, means on said back shaft axially movable with respect thereto engaging the Geneva wheel at selected points thereon whereby during a single revolution of said means the drive shaft and intermediate gears are caused to move through a selected series of steps to position the rotatable turret and means moving said axially movable means on the back shaft to position it to engage the Geneva wheel at a selected point.

2. An indexing mechanism for turret lathes and the like having a rotatable turret connected to a drive shaft by intermediate gears, comprising a Geneva wheel connected to said drive shaft, a back shaft driven by a lathe drive, dog carriers mounted for rotation on the back shaft and axially movable thereon to bring a selected carrier in line with the Geneva wheel, dogs mounted on said dog carriers, each successive carrier having a different number of dogs capable of engaging successive slots in the Geneva wheel, means for moving said carriers on said back shaft whereby to vary the number of dogs engaging the Geneva wheel and means engaging said back shaft and said dog carriers to rotate the dog carriers whereby to move the drive shaft and intermediate gears through a selected series of steps to position the rotatable turret.

3. An indexing mechanism for turret lathes and the like having a rotatable turret connected to a drive shaft through intermediate gears, comprising a Geneva wheel connected to said drive shaft, a back shaft driven by a lathe drive for continuous rotation, a pair of dog carriers slidably mounted on opposite sides of the Geneva wheel, one of which carries a single dog and the other carries two angularly displaced dogs capable of engaging successive slots in the Geneva wheel and means for moving said dog carriers axially of the back shaft whereby the dogs on one of said carriers will engage the Geneva wheel for rotation thereof.

4. An indexing mechanism as claimed in claim 3 having a one revolution clutch between the dog carriers and the back shaft and means for engaging said clutch at determined intervals whereby the dog carriers are rotated with the back shaft and the Geneva wheel is rotated by the selected dog carrier.

5. An indexing mechanism for turret lathes and the like having a rotatable turret connected to a drive shaft through intermediate gears and locking means engaging the turret and holding it in indexed position comprising a Geneva wheel connected to said drive shaft, a back shaft driven by a lathe drive for continuous rotation, a pair of dog carriers slidably mounted on opposite sides of the Geneva wheel, one of which carries a single dog and the other carries two angularly displaced dogs capable of engaging successive slots in the Geneva wheel, means for moving said dog carriers axially of the back shaft whereby the dogs on one of said carriers will engage the Geneva wheel for rotation thereof and cam means on the back shaft actuating the locking means selectively into and out of engagement in timed relationship to the rotation of the Geneva wheel.

6. An indexing mechanism as claimed in claim 5 wherein the means actuating the locking means comprises a pair of spaced cams on the back shaft, a cam follower selectively engaging said cams as the dog carriers are moved on the back shaft, said cam follower actuating the locking means in timed relation to the rotation of the Geneva wheel.

7. An indexing mechanism for turret lathes having a rotatable turret and locking means for the turret comprising a turret slide on a lathe frame, a turret rotatably mounted on said slide, an intermediate shaft geared to said turret for rotation thereof, a Geneva wheel mounted on said shaft, a continuously driven back shaft substantially parallel to the intermediate shaft, a sleeve axially slidable thereon, a one revolution clutch coupling said sleeve to the back shaft, two dog carriers on said sleeve on either side of the Geneva wheel for selective engagement therewith, a pair of cams axially spaced on the sleeve and arranged selectively to be brought into engagement with a cam follower actuating the turret locking means, a front shaft in the lathe frame, a cross shaft driven thereby, a cam on the cross shaft actuating the turret slide and cam means imparting axial movement to the sleeve on the back shaft, said cam means being driven by the front shaft whereby the dog carriers and cams on the sleeve are positioned relative to the Geneva wheel.

8. An indexing mechanism for the turret of an automatic machine tool, which indexing mechanism comprises driving means, a transmission between the driving means and the turret, a Geneva wheel in the transmission, two dog carriers in the transmission, dogs on said carriers engageable with corresponding slots in the Geneva wheel, the dog carrier being provided with at least one dog and the other dog carrier being provided with a different number of dogs, and means for selectively engaging the dog carriers with the Geneva wheel, whereby the extent of angular rotation of the turret can be adjusted.

9. An indexing mechanism for the turret of an automatic machine tool, which indexing mechanism comprises a Geneva wheel, a transmission connecting the Geneva wheel to the turret, a driving shaft, two dog carriers on and rotatable with the driving shaft and disposed one on either side of the Geneva wheel, a single dog on one of the dog carriers engageable in a slot of the Geneva wheel, two angularly-displaced dogs on the other dog carrier successively engageable in two successive slots of the Geneva wheel and means for effecting relative axial movement between the dog carriers and the Geneva wheel, whereby a driving connection can be made between either one of the dog carriers and the Geneva wheel.

10. An indexing mechanism for the turret of an automatic machine tool having a movable turret and locking means therefor comprising driving means, a transmission between the driving means and the turret, a Geneva wheel in the transmission, two dog carriers in the transmission, dogs on said carriers engageable with corresponding slots in the Geneva wheel, one of said dog carrier being provided with at least one dog and the other dog carrier being provided with a different number of dogs, means for selectively engaging the dog carriers with the Geneva wheel whereby the extent of angular rotation of the turret can be adjusted and means for the operation of the locking means in accordance with the extent of angular rotation imparted to the turret.

11. An indexing mechanism as claimed in claim 3 in which the timing means comprise two cams, a cam follower, and means operatively connecting the cam follower with the locking means, said cams being selectively engageable with the cam follower by the aforesaid means for selelctively engaging the dog carriers with the Geneva wheel.

12. In an automatic turret lathe having a movable turret and locking means therefor for locking the turret in an indexed position, a turret slide having the turret rotatably mounted thereon, a front shaft, a cross shaft driven thereby, a continuously driven back shaft, a sleeve axially slidable on the back shaft, a one-revolution clutch for coupling the sleeve to the back shaft, an intermediate shaft, a transmission between the intermediate shaft and the turret, a Geneva wheel connected to the intermediate shaft, two dog carriers on the aforesaid sleeve on either side of the Geneva wheel, dogs on said dog carriers engageable with corresponding slots in the Geneva wheel, one dog carrier having at least one dog and the other dog carrier having a different number of dogs, two cams axially spaced apart on said sleeve, a cam follower, means operatively connecting the cam follower with the locking means, cam means adapted to impart axial movement to the sleeve, whereby one of said dog carriers is drivably coupled with the Geneva wheels and one of said cams is selectively engaged with the cam follower, said cam means being actuated by the front shaft.

13. An automatic turret lathe as claimed in claim 12 in which the cam means for imparting axial movement to the sleeve comprises a face cam connected to the sleeve, a reciprocable plunger, a follower on said plunger engageable with the face cam, means for reciprocating said plunger and a cam on the cross shaft for actuating said reciprocating means.

14. An indexing mechanism for turret lathes and the like having a rotatable turret connected to a drive shaft by intermediate gears and locking means for locking the turret in an indexed position comprising a Geneva wheel connected to said drive shaft, a back shaft driven by a lathe drive, means on said back shaft axially movable with respect thereto engaging the Geneva wheel at selected points thereon whereby during a single revolution of said means the drive shaft and intermediate gears are caused to move through a selected series of steps to position the rotatable turret, means moving said axially movable means on the back shaft to position it to engage the Geneva wheel at a selected point and means for the operation of the locking means in accordance with the extent of angular rotation imparted to the turret.

References Cited in the file of this patent

UNITED STATES PATENTS

| | | |
|---|---|---|
| 1,787,217 | Steere | Dec. 30, 1930 |
| 2,449,852 | Jones | Sept. 21, 1948 |
| 2,579,092 | Rockwell | Dec. 18, 1951 |
| 2,606,575 | Curtis | Aug. 12, 1952 |
| 2,657,453 | Brodhun | Nov. 3, 1953 |